(12) United States Patent
Laufer et al.

(10) Patent No.: US 8,772,387 B2
(45) Date of Patent: Jul. 8, 2014

(54) DISPERSION ADHESIVES, A PROCESS FOR PREPARING THEM AND USE THEREOF

(75) Inventors: Wilhelm Laufer, Ellerstadt (DE); Peter Schuster, Göschenen (CH); Christian Scheffner, Sandhausen (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 13/268,111

(22) Filed: Oct. 7, 2011

(65) Prior Publication Data

US 2012/0123052 A1    May 17, 2012

(30) Foreign Application Priority Data

Oct. 13, 2010 (EP) .................................... 10187405
Nov. 22, 2010 (EP) .................................... 10192087

(51) Int. Cl.
 *C08K 5/29* (2006.01)
(52) U.S. Cl.
 USPC ........................................................ 524/195
(58) Field of Classification Search
 USPC ........................................................ 524/195
 See application file for complete search history.

(56) References Cited

U.S. PATENT DOCUMENTS

| | | | |
|---|---|---|---|
| 2,840,589 A | 6/1958 | Smeltz | |
| 4,888,124 A * | 12/1989 | Blum et al. | 252/182.2 |
| 4,915,984 A | 4/1990 | Murakami | |
| 5,498,747 A * | 3/1996 | Pohl et al. | 560/25 |
| 5,821,294 A | 10/1998 | Perlinski | |
| 5,929,188 A | 7/1999 | Nakamura et al. | |
| 6,310,125 B1 | 10/2001 | Rayner | |
| 6,444,737 B1 | 9/2002 | Rayner | |
| 2002/0193534 A1 | 12/2002 | Abend | |
| 2002/0198313 A1 | 12/2002 | Meyer-Roscher et al. | |
| 2007/0286975 A1 | 12/2007 | Fazel et al. | |
| 2008/0262131 A1 | 10/2008 | Linnenbrink et al. | |
| 2009/0017310 A1 | 1/2009 | Demmig et al. | |
| 2010/0065209 A1 | 3/2010 | Burghardt et al. | |
| 2010/0075139 A1 | 3/2010 | Kato et al. | |

FOREIGN PATENT DOCUMENTS

JP          10060272 A      3/1998

OTHER PUBLICATIONS

European Search Report from co-pending Application EP10187405 dated Feb. 1, 2011, 4 pages.
"Polyurethane—Lacke, Kleb- and Dichtstoffe", by Ulrich Meier-Westhues, (Technologie des, Beschichtens), Hanover: Vincentz Network, (2007), pp. 262-273.

* cited by examiner

*Primary Examiner* — John Uselding
(74) *Attorney, Agent, or Firm* — Nicanor A. Kohncke

(57) ABSTRACT

The present claims relate to aqueous dispersion adhesives comprising at least one polyurethane dispersion and at least one carbodiimide having the general formula R'—(—N=C=N—R—)$_m$—R", in which m corresponds to an integer from 1 to 500, R=arylene and/or $C_7$-$C_{11}$ aralkylene, R'=R—NCO, and R"=—NCO, where in R', independently of one another, $R^1$ and $R^2$ are identical or different and represent a $C_1$-$C_6$ alkyl, $C_6$-$C_{10}$ cycloalkyl or $C_7$-$C_{18}$ aralkyl radical.

8 Claims, No Drawings

DISPERSION ADHESIVES, A PROCESS FOR PREPARING THEM AND USE THEREOF

The present invention relates to innovative aqueous dispersion adhesives, processes for preparing them and use thereof in the furniture and automotive industries.

TDI uretdiones, such as Desmodur® TT or Addolink® TT, for example, have to date been used in dispersion adhesives primarily for deployment in the furniture industry; see EP 0 922 720A. This application is described in detail in, for example, "Polyurethane-Lacke, Kleb- and Dichtstoffe", by Ulrich Meier-Westhues, (Technologie des Beschichtens), Hanover: Vincentz Network, (2007), pages 262-273. These substances have the disadvantage that they are expensive to prepare and on account of the possible elimination of toxic TDI are restricted in their possibilities for deployment in the automotive industry (car interior).

An object of the present invention, therefore, was to provide inexpensive alternatives for aqueous dispersion adhesives, especially in the sector of the automotive industry.

Surprisingly it has now been found that aqueous dispersion adhesives comprising certain carbodiimides and polyurethane dispersions do not have the disadvantages of the prior art and are suitable outstandingly as dispersion adhesives for deployment in the furniture and automotive industries.

The present invention accordingly provides aqueous dispersion adhesives comprising at least one polyurethane dispersion and at least one carbodiimide of the formula (I)

in which
m corresponds to an integer from 1 to 500,
R=arylene, preferably $C_6$-$C_{15}$-arylene, and/or $C_7$-$C_{11}$ aralkylene,

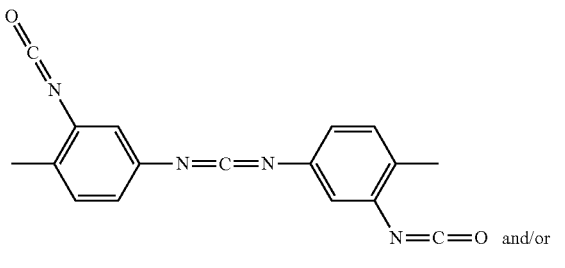

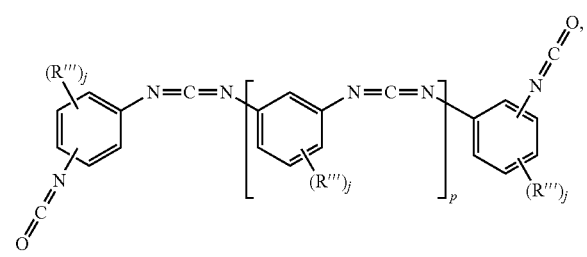

where R'''=$C_1$-$C_{18}$ alkylene, $C_5$-$C_{18}$ cycloalkylene, arylene, preferably $C_6$-$C_{15}$-arylene, and/or $C_7$-$C_{18}$-aralkylene and j within the molecule is identical or different and denotes 1 to 5, and p can be =0 to 500, and/or sterically hindered carbodiimides of the formula (IV)

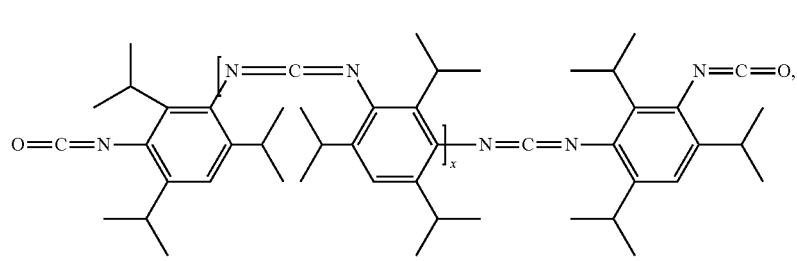

where x=1 to 500, preferably 1-50.

As a consequence of their preparation, the aforementioned carbodiimides of the formulae (I) to (IV) may also be obtained in the form of mixtures of monomeric, oligomeric and/or polymeric compounds. These mixtures are encompassed by the subject matter of the invention.

The compounds of formulae (I) to (IV) are available commercially, as for example from Rhein Chemie Rheinau GmbH, or can be prepared by processes familiar to the skilled person, as described, for example, in DE-A-11 30 594 or U.S. Pat. No. 2,840,589, or through the condensation of diisocyanates at elevated temperatures, e.g. at 40° C. to 200° C., in the presence of catalysts, with elimination of carbon dioxide. Examples of catalysts found suitable include strong bases and phosphorus compounds. Preference is given to using phospholene oxides, phospholidines or phospholine oxides, and also the corresponding sulphides. As catalysts it is additionally possible for tertiary amines, basic metal compounds, metal salts of carboxylic acids, and non-basic organometallic compounds to be used.

R'=R—NCO, R—NHCONHR¹, R—NHCONR¹R² or R—NHCOOR³ and
R"=—NCO, —NHCONHR¹, —NHCONR¹R² or —NHCOOR³,
where in R', independently of one another, R¹ and R² are identical or different and represent a $C_1$-$C_6$ alkyl, $C_6$-$C_{10}$ cycloalkyl or $C_7$-$C_{18}$ aralkyl radical, and R³ has one of the definitions of R¹.

It is likewise possible to make use of mixtures of carbodiimides of the formula (I) as well, including the corresponding oligomers and/or polymers.

Preference here is given to using monomeric carbodiimides of the formula (I) which are based on aromatic and/or aliphatic diisocyanates.

In one particularly preferred embodiment of the invention, the carbodiimides/compounds correspond to the formulae (II) to (IV)

Suitable for preparing the compounds and/or polymers used are all diisocyanates, with preference being given in the context of the present invention to the use of carbodiimides and/or polycarbodiimides based on $C_1$ to $C_4$ alkyl-substituted aromatic isocyanates, such as, for example, 2,4-tolylene diisocyanate (TDI), 2,6-tolylene diisocyanate, a mixture of 2,4-tolylene diisocyanate and 2,6-tolylene diisocyanate, xylylene diisocyanate, 2,6-diisopropylphenyl isocyanate, 2,4,6-triisopropylphenyl 1,3-diisocyanate, 2,4,6-triethylphenyl 1,3-diisocyanate, 2,4,6-trimethylphenyl 1,3-diisocyanate, 2,4'-diisocyanatodiphenylmethane, 1,5-naphthalene diisocyanate, 4,4'-diphenylmethane diisocyanate, 2,4'-diphenylmethane diisocyanate, 2,2-diphenylmethane diisocyanate, 4,4'-diphenyldimethylmethane diisocyanate, 1,3-phenylene diisocyanate, 1,4-phenylene diisocyanate, 2,6-diisopropylphenylene isocyanate and 1,3,5-triisopropylbenzene 2,4-diisocyanate or mixtures thereof. It is particularly preferred for the carbodiimides and/or polycarbodiimides to be based on 2,4-tolylene diisocyanate and 2,6-tolylene diisocyanate or on a mixture of 2,4-tolylene diisocyanate and 2,6-tolylene diisocyanate.

In a further embodiment of the present invention it is also possible to use a mixture of different carbodiimides.

The solid carbodiimides used have with particular preference a particle size of <50 μm.

In another preferred embodiment of the invention, the compounds of the formulae (I) to (IV) may be present in the form of an aqueous dispersion. In these cases the active ingredient content is preferably 20% to 80%, more preferably 40% to 60%.

The polyurethane dispersions for the purposes of the invention are preferably aqueous, ionic or non-ionic polyurethanes or polyester polyurethanes which contain polar groups and/or contain solvent, and which are based on aromatic and/or aliphatic isocyanates, preferably aliphatic isocyanates, such as hexamethylene diisocyanate, for example. These dispersions are available commercially, for example as "Dispercoll® U" products from Bayer MaterialScience AG.

Polar groups for the purposes of the invention are, for example, hydroxyl, sulphonate, ether or carboxyl groups.

The aqueous dispersion adhesives of the invention preferably have the following composition:
0.2%-10%, more preferably 0.5%-5%, of at least one carbodiimide of the formulae (I)-(IV) and
99.8%-90%, more preferably 99.5%-95%, of PU dispersion.

The active ingredient fraction in both cases is preferably 20% to 80%.

The carbodiimides of the formulae (I) to (IV) that are used are preferably solid or liquid at room temperature.

In another preferred embodiment of the invention, the solid carbodiimides of the formulae (I) to (IV) are surface-deactivated by reaction with at least one amine.

For the surface deactivation (microencapsulation), amines which can be used include all amino-functional compounds. Preferably these are polyfunctional primary and secondary amines, more preferably polyfunctional aliphatic amines. Amines suitable in accordance with the invention are selected more particularly from the group consisting of cyclic and aliphatic, straight-chain or branched $(C_2-C_{14})$-alkylamines, -diamines and -polyamines, more particularly $(C_2-C_{10})$-alkylamines, -diamines and -polyamines, preferably $(C_2-C_6)$-alkylamines, -diamines and -polyamines, it being possible for the alkyl chain to be interrupted at least partly or else completely by heteroatoms, more particularly oxygen or sulphur, and/or to contain further substituents, such as, for example, hydroxyl groups, carboxyl groups, halogen or the like.

Examples of amines suitable in accordance with the invention include the following compounds: 2-pentamethylene-1,5-diamine and its isomers and homologues such as, for example, 1,6-hexamethylenediamine; di-sec-butylamine; ethylenediamine; 1,3-propylenediamine; diethylenetriamine; triethylenetetramine; 3,3'-dimethyl-4,4'-diaminodicyclohexylmethane; methylnonanediamine; isophoronediamine; 4,4'-diaminodicyclohexylmethane; alkanolamines and -diamines such as ethanolamine and diethanolamine and/or amidoamines. Especially preferred among these are 2-pentamethylene-1,5-diamine and its isomers and homologues such as, for example, 1,6-hexamethylenediamine.

With particularly preference, these amines are polyfunctional primary and secondary, more preferably polyfunctional aliphatic, amines, such as, for example, Jeffamine® T 403 from Huntsman, diisopropanolamine from BASF AG or amidoamines, such as Versamid 140 from Cognis or Euretek 505 from Witco. More particularly they are compounds having hydrophilic groups, such as, in particular, amino groups or hydroxyl groups, which are able to react with the free isocyanate groups of the solid diisocyanate and which therefore form a surface shell on the isocyanates that initially deactivates the isocyanates—accordingly, for example, amines, diamines and polyamines.

In one preferred embodiment of the invention a surface deactivator used is a low-molecular-weight mono-, di- or polyamine having one or more primary and/or secondary amino group(s), in amounts such that the degree of deactivation (DD), calculated as equivalents ratio of amino groups of the surface deactivator to the isocyanate groups and/or carbodiimide groups of the carbodiimide to be deactivated (n $NH_2$/n NCO), is between 0.2 and 8 equivalent-%.

The surface deactivator may in particular have a molecular weight MW of up to 600 g/mol.

In this context, concentrations of surface deactivator (amine), based on the amount of adhesion promoter, of 1% to 10% by weight are preferred, with particular preference 2% to 5% by weight.

The surface deactivation is accomplished preferably by addition of the amine to an aqueous dispersion of the carbodiimide, which optionally further comprises dispersant and anti-settling agent, with stirring and/or grinding. It is also possible, however, to carry out the surface deactivation by adding the amine to an organic dispersion, for example in alcohol, toluene, etc., of the carbodiimide.

For the stirring/grinding operation it is possible to use commercial machines, such as bead nil dissolvers or blade stirrers, for example.

The carbodiimides are deactivated in a manner known per se; see, in particular, EP 0 205 970 A and U.S. Pat. No. 4,888,124, the content of which is hereby incorporated in its entirety by reference, as for example through:
a) dispersing of the solid carbodiimide in powder form in a solution of the amine, or
b) addition of the amine or of a solution of the amine to a dispersion of the solid, finely divided carbodiimide.

This surface deactivation may take place in water and/or else in organic solvents.

In a further embodiment of the present invention, the aqueous dispersion adhesives of the invention further comprise wetting agents and dispersants, such as Tamol® NN 9104 from BASF AG or Aerosol® OT45 from Cytec Surface Specialities GmbH, for example, Dispersogen® HR from Clariant International Ltd., and/or stabilizers, emulsifiers, thickeners, such as, for example, anti-settling agents, such as inter alia Borchi®Gel ALA (OMG Borchers GmbH) or Kelzan®

S, available from Monsanto, or else tragacanth, available from R. T. Vanderbilt, and/or defoamers.

The proportions of stabilizers, emulsifiers, thickener and/or defoamer are preferably 0.1%-10%.

The present invention further provides a process for preparing the aqueous dispersion adhesives of the invention, in which at least one compound of the formula (I) to (IV), optionally in the form of an aqueous dispersion and/or optionally in microencapsulated form, is incorporated by stirring into the polyurethane dispersion, which optionally comprises further additives.

In the cases in which the microencapsulated carbodiimides of the formula (I) to (IV) are to be used, the aqueous dispersion adhesives of the invention may also be prepared as follows:
here, first of all, the carbodiimide or carbodiimides of the formulae (I) to (IV) is or are incorporated by stirring, optionally in the form of an aqueous dispersion, into the polyurethane dispersion and then surface-deactivated by the aforementioned reaction with amines.

For this stirred incorporation it is possible to use all commercial mixing assemblies, such as dissolvers, for example.

An aqueous dispersion is prepared using carbodiimides/compounds of the formulae (I) to (IV) in accordance with the methods familiar to the skilled person, optionally in the presence of further additives, such as, for example, wetting agents and dispersants, anti-settling agents, defoamers, etc., in commercial assemblies, such as dissolvers, for example.

For the preparation the temperature is preferably in the range from 5 to 50° C.

The stirred incorporation of the carbodiimides is accomplished using commercial mixing assemblies, such as stirred tanks and dispersers, for example.

The present invention additionally provides for the use of the aqueous dispersion adhesives of the invention, optionally comprising further additives, in the furniture and automotive industries, in footwear manufacture or else in the textile industry, for the production of fabric/film composites, for example.

Preferred applications are the following: worktops and front panelling for kitchens, and dashboards in automotive engineering.

The present invention further provides a new process for preparing furniture, textile, panels for automotive industries and/or footweare by applying the aqueous dispersions adhesives according to the invention on the surface of the materials such as e.g. wood, pvc etc. to attach additional layers such as laminate etc.

The dispersions can be applied by spraying, painting etc., see e.g. Ulrich Meier-Westhues, Vincentz Network, (2007), pages 266-273.

In one preferred embodiment of the invention the dispersions are activated by heat.

The examples which follow serve to illustrate the invention, without having any limiting effect.

WORKING EXAMPLES

Chemicals Used

TDI carbodiimide, a carbodiimide based on 2,4-tolylene diisocyanate, of formula (II),
Addolink® TT, a TDI uretdione, available from Rhein Chemie Rheinau GmbH,
Stabaxol® P 200, a carbodiimide based on 1,3-tetramethylxylylene diisocyanate (TMXDI), available from Rhein Chemie Rheinau GmbH,
Carbodilite LA-01, a carbodiimide based on dicyclohexylmethane 4,4'-diisocyanate (H12MDI), which still contains isocyanate groups, and is available from Nisshinbo Chemical Inc.,
Carbodilite HMV8 CA, a carbodiimide based on dicyclohexylmethane 4,4'-diisocyanate (H12MDI), available from Nisshinbo Chemical Inc.,
Tween 85, wetting/dispersing agent, available from Münzing Chemie GmbH,
Kelzan® S, anti-settling agent, available from Monsanto,
Jeffamin® T 403, polyetheramine for surface deactivation, available from Huntsman International LLC,
Agitan 281, defoamer, available from Fluka,
Dispercoll U53, a 40% dispersion of an anionic, high-molecular-weight polyurethane dispersion, available from BayerMaterialScience AG, and
Borchi Gel® L 75, anti-settling agent, available from OMG Borchers GmbH.

Table 1 summarizes the quantities employed in preparing an aqueous Addolink® TT or TDI carbodiimide dispersion:

TABLE 1

| Material | Ex. 1 (inv.) | Ex. 2 (CE) | Ex. 3 (CE) | Ex. 4 (CE) | Ex. 5 (CE) |
|---|---|---|---|---|---|
| TDI carbodiimide | 40 | | | | |
| Addolink TT | | 40 | | | |
| Stabaxol P 200 | | | 40 | | |
| Carbodilite LA-01 | | | | 40 | |
| Carbodilite HMV 8CA | | | | | 40 |
| Water | 52.6 | 52.6 | 60 | 52.6 | 55.0 |
| Tween 85 | 0.5 | 0.5 | | 0.5 | 0.5 |
| Agitan 281 | 0.45 | 0.45 | | 0.45 | 0.45 |
| Jeffamin ® T 403 | 2.5 | 2.5 | | 2.5 | |
| Kelzan ® S, 3% in water | 4 | 4 | | 4 | 4 |

CE = comparative example,
inv. = inventive;
the quantities employed are indicated in parts by weight In Examples 1, 2, 4 and 5, water and wetting/dispersing agent and defoamer (Agitan 281 and Tween 85) were combined and dissolved/mixed. Then the crosslinker was added and the mixture was homogenized in a dissolver. Subsequently, except for in Example 5, Jeffamin® T 403 was added and was mixed in, with shearing forces being avoided. Thereafter the freshly prepared Kelzan® S preparation was mixed in and homogenized. In Example 3, the crosslinker was dissolved in water.

Example 6

Inventive

In 96.5 parts of Dispercoll U53, 2.5 parts of the dispersion from Example 1 were stirred together with one (1) part of Borchi Gel® L 75.

Example 7

Comparative

In 96.5 parts of Dispercoll U53, 2.5 parts of the dispersion from Example 2 were stirred together with one (1) part of Borchi Gel® L 75.

Example 8

Comparative

In 96.5 parts of Dispercoll U53, 2.5 parts of the dispersion from Example 3 were stirred together with one (1) part of Borchi Gel® L 75.

Example 9

Comparative

In 96.5 parts of Dispercoll U53, 2.5 parts of the dispersion from Example 4 were stirred together with one (1) part of Borchi Gel® L 75.

Example 10

Comparative

In 96.5 parts of Dispercoll U53, 2.5 parts of the dispersion from Example 5 were stirred together with one (1) part of Borchi Gel® L 75.

Example 11

Comparative

A quantity of 99.0 parts of Dispercoll U53 was stirred together with one (1) part of Borchi Gel® L 75.

Using these dispersions, a heat distortion resistance test was carried out. For this purpose, a sheet of wood was bonded to a sheet of PVC, with the application, to a bond area of 20×20 mm, of 0.15 g of the dispersion adhesives from Ex. 6, 7, 8, 9, 10 or 11 on the wood side and 0.08 g of the dispersion adhesive from Ex. 6, 7, 8, 9, 10 or 11 on the PVC side. The sheets were subsequently pressed with a 5 kg weight at 80° C. for 60 minutes.

In a drying cabinet, ballast structures each weighing 5 kg are suspended from the test specimens produced above. Commencing with a temperature of 40° C., heating takes place at a rate of 10 K/h.

A measurement is made of the temperature at which the bond fails and the weights fall down. The test results are set out in Table 3:

TABLE 3

| Material | Ex. 6 (inv.) | Ex. 7 (CE) | Ex. 8 (CE) | Ex. 9 (CE) | Ex. 10 (CE) | Ex. 11 (CE) |
|---|---|---|---|---|---|---|
| Heat distortion stability test Temperature in ° C. | 82.5 | 64.6 | 57.2 | 53.6 | 52.7 | 50.8 |

CE = comparative example,
inv. = inventive

The results of the experiment show clearly that for a given amount, the aqueous dispersion adhesives of the invention exhibit a greater heat distortion stability.

The invention claimed is:

1. Aqueous dispersion adhesives comprising at least one polyurethane dispersion and at least one carbodiimide of the formulae (II), (III) and/or (IV)

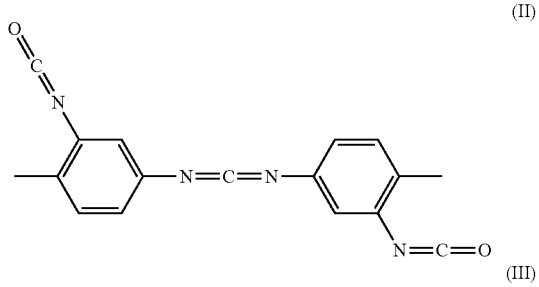
(II)

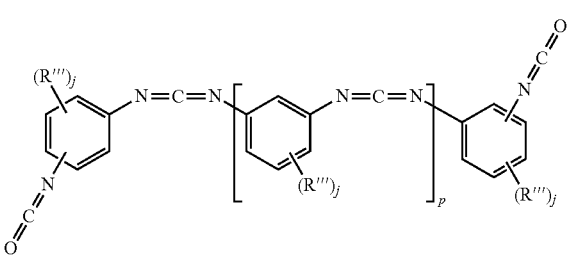
(III)

where $R''' = C_1\text{-}C_{18}$ alkylene, $C_5\text{-}C_{18}$ cycloalkylene, arylene and/or $C_7\text{-}C_{18}$ aralkylene and j within the molecule is identical or different and denotes 1 to 5, and p can be =0 to 500,

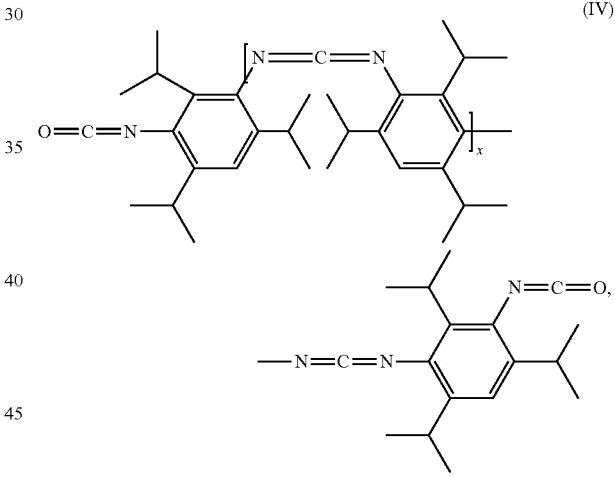
(IV)

where x=1 to 500.

2. The aqueous dispersion adhesives according to claim 1, wherein the carbodiimide is surface-deactivated by reaction with at least one amine.

3. The aqueous dispersion adhesives according to claim 1, wherein the carbodiimide is present in the form of an aqueous dispersion.

4. The aqueous dispersion adhesives according to claim 1, wherein the polyurethane dispersion is substantially an aqueous dispersion.

5. The aqueous dispersion adhesives according to claim 1, wherein the polyurethane dispersion comprises aqueous polyurethanes, ionic polyurethanes, non-ionic polyurethanes, and polyester polyurethanes which contain polar groups and/or contain solvent, which are based on aromatic and/or aliphatic isocyanates.

6. The aqueous dispersion adhesives according to claim 1, further comprising stabilizers, emulsifiers, thickeners and/or defoamers.

7. A process for preparing the aqueous dispersion adhesives according to claim 1, comprising:
   incorporating into the polyurethane dispersion with stirring said carbodiimide of the formulae (II) to (IV).

8. A process for preparing furniture, textile and panels for automotive industries and/or footwear, comprising:
   applying the aqueous dispersion adhesives according to claim 1 to the surface of the furniture, textile and panels for automotive industries and/or footwear.

* * * * *